UNITED STATES PATENT OFFICE.

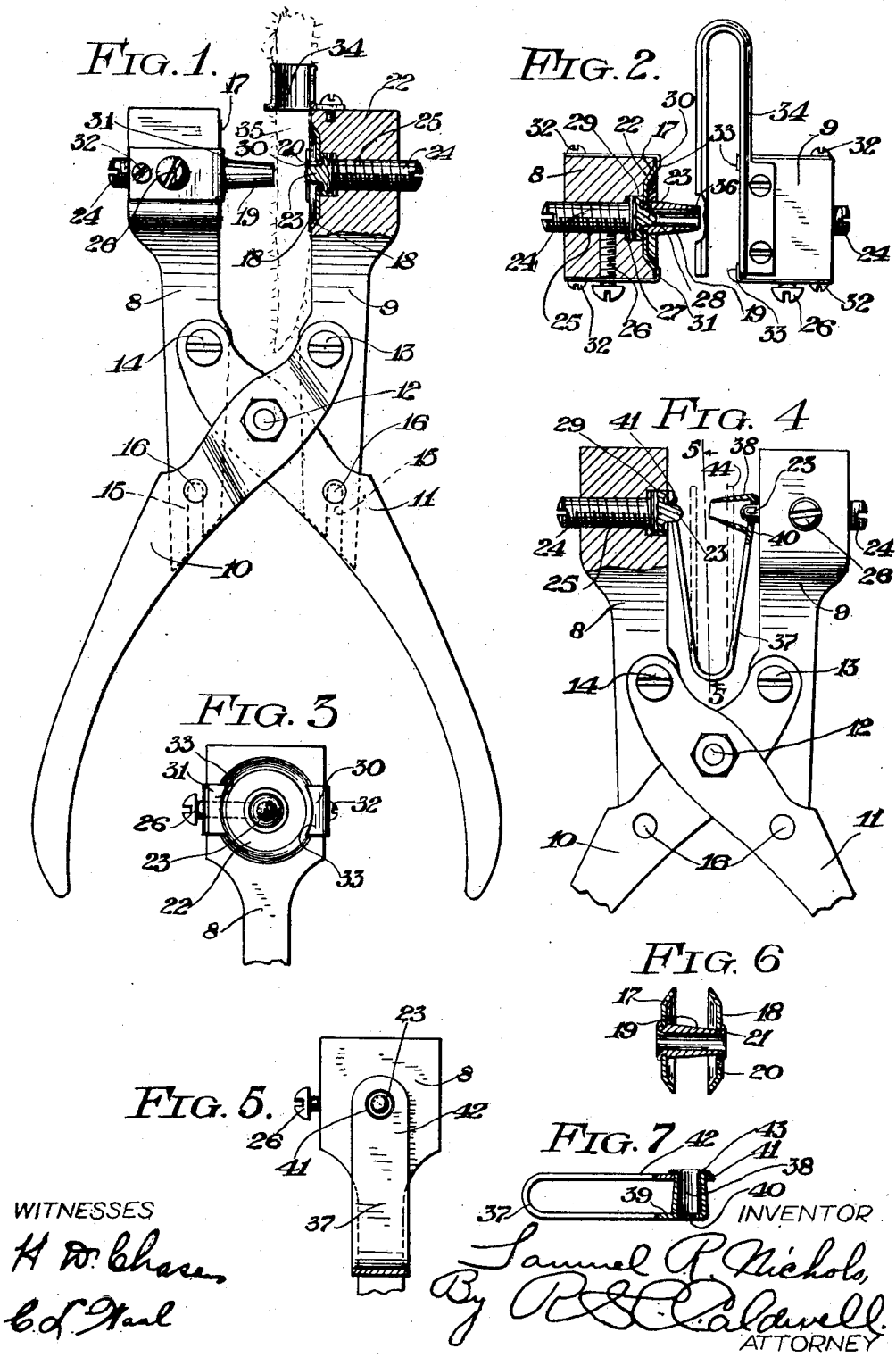

SAMUEL R. NICHOLS, OF SHELTON, NEBRASKA.

RIVETING-TOOL.

1,348,040.　　　　　　Specification of Letters Patent.　　Patented July 27, 1920.

Application filed June 6, 1919. Serial No. 302,331.

*To all whom it may concern:*

Be it known that I, SAMUEL R. NICHOLS, a citizen of the United States, and resident of Shelton, in the county of Buffalo and State of Nebraska, have invented new and useful Improvements in Riveting-Tools, of which the following is a description, reference being had to the accompanying drawings, which are a part of this specification.

The invention relates to a tool for affixing identification tags to animals by passing a part of the tag through the flesh of the animal.

One of the objects of this invention is to provide a tool which will rivet or crimp two clamping members together on opposite sides of the flesh of the animal by crimping over a part of a shank portion carried by one of the members on to the other member.

A further object of the invention is to provide a tag applying tool with a gage which is moved over the flesh of the animal so that the tag may be applied through the flesh where it is of a proper thickness to receive the tag.

Another object of the invention is to provide a tag applying tool with spring means for releasably securing to the tool parts of the tag during their application to the animal.

The invention further consists in the several features hereinafter set forth and more particularly defined by claims at the conclusion hereof.

In the drawings: Figure 1 is a side view of the device embodying the invention, parts being broken away and parts being shown in section; Fig. 2 is an end view of the device parts being broken away and parts being shown in section; Fig. 3 is a detail view of the face of one of the jaws of the device; Fig. 4 is a view of the device part in section for use on a slightly different form of tag; Fig. 5 is a detail view taken on the line 5—5 of Fig. 4; Fig. 6 is a sectional view through one of the identification tags which are used with the tool; Fig. 7 is a detail view part in section of another form of tag used with the tool.

The device consists of a pair of jaws 8 and 9 which are provided with suitable tag holding means as hereinafter described and are actuated by handles 10 and 11 so that the jaws may move parallel to and toward each other. This actuation of the jaws is not new but is accomplished by pivoting the handles 10 and 11 together by a bolt 12, pivoting the end of the handle 10 to the jaw 9 by a screw 13 and the end of the handle 11 to the jaw 8 by a screw 14, and providing slots 15 in the lower ends of the jaws in which pins 16 carried by the handles are free to move.

In the construction shown in Figs. 1 and 2 the tool is designed to attach a tag such as is shown in Fig. 6. This tag consists of a pair of clamping members 17 and 18 which may receive the desired identification data on their outer faces and which are secured together by a tubular shank 19 which is carried by the member 17 and is inserted through the flesh of the animal and is then passed through an opening 20 in the member 18 and the projecting portion 21 of the shank is then crimped over by the tool upon the member 18. The jaws of the tool are designed to receive the opposed clamping members 17 and 18 and to center these members so that a hollow shank 19 may be forced through the flesh of the animal and crimped to the detached member 18. To this end each of the jaws 8 and 9 is provided with a dished recess 22 shaped to conform to the outer face of the members 17 and 18 and each jaw is also provided with a centering and crimping die member 23 which is provided with a screw threaded end 24 engaging a threaded bore 25 in the head of the jaw, so that the die 23 may be adjusted in the head of the jaw, after which it is clamped in adjusted position by means of a set screw 26. The die 23 is larger than the screw threaded portion 24 and is movable to adjusted position in a bore 27 in the head of the jaw. The die 23 has a conical head 28 and a semi-circular annular crimping groove 29 extending from the bottom of this head. The dies 23 are in line with each other at all times and the conical end 28 of the die on the jaw 8 fits into the hollow or bore of the shank 19 adjacent the member 17, while the pointed end 23 of the die for the jaw 9 is adapted to fit into the forward end of the hollow shank 19. The members 17 and 18 are releasably secured to the jaws 8 and 9 respectively in each instance by means of spring fingers 30 and 31 secured to the jaws by screws 32 and having portions 33 projecting over the faces of the jaws so as to releasably engage the outer edges of the clamping members.

In order that the tag may be affixed to the animal so that the clamping members will engage opposite sides of the flesh but will not be pressed into the flesh of the animal, a gage member 34 is secured to the jaw 9 and projects outwardly beyond said jaw. This gage member is in the form of a U-shaped member so that a part of the animal, such as an ear 35, may be passed through the two arms of the gage and moved to such a position as to provide the requisite thickness of flesh for the attachment of the tag, it being understood that the distance between the arms of the gage is about equal to the distance between the contacting faces of the clamping members 17 and 18 when the tag is in attached position. The jaws are preferably held spaced apart in their inner position the gaged width by abutting against each other at one point or by a fixed stop.

In the use of this tool, the member 17 with its shank is releasably secured to the jaw 8, while the member 18 is releasably secured to the jaw 9, as shown in Figs. 1 and 2, and the ear 35 or other part of the animal is passed through the gage 34 to the required point, then the jaws 8 and 9 are moved together, during which time the cutting edge 36 of the shank cuts through the flesh of the ear and then passes through the opening 20 onto the pointed end of the die 23 and then on further pressure this pointed edge 36 of the shank is pressed around the opening 20 to form a crimped edge 21 by the action of the curved annular groove 29 in the die 23 of the jaw 9 as said annular groove compels the cutting edge to turn over against the outer face of the member 18 while the member 18 is held at a fixed distance from the member 17.

In Fig. 7 I have shown a form of identification tag consisting of a U-shaped member 37 having a tubular shank portion 38 formed integral with one of the arms 39 of the tag with an opening 40 adjacent this tubular shank, said tubular shank having a cutting edge similar to that shown on the shank 19 in Fig. 6, which is adapted to be passed through an opening 41 in the other arm 42 of the tag 37 and to be crimped over said arm adjacent the opening as shown at 43 in Fig. 7. For attaching the tag of the form shown in Fig. 7 it is not necessary to provide spring fingers or the gage and the tag is affixed preparatory to attachment to the animal to the dies 23 on the jaws as shown in Fig. 4. The conical ends 28 of the dies thus serve to center the ends of the arms and when a portion of the flesh of the animal is interposed between the two ends of the arms with the arms in open position as shown in Fig. 4, a movement of the jaws toward each other will force the shank 38 through the flesh and onto the conical end 28 of the die 23 and then through the opening 41 around which the end 44 of the shank is crimped by the action of the curved annular recess 29 of the die carried by the jaw 8, in a manner similar to that previously described.

With a tool of this kind proper positioning of the parts to be clamped to the opposite sides of the flesh of the animal is insured, the tag is quickly applied and the crimping of the shank effectively secures the tag in position.

What I claim as new and desire to secure by Letters Patent is:

1. In a tool for attaching identifying tags to animals, the combination, with tag applying means including movable jaws, of a gage member carried by one of the jaws for gaging the thickness of the flesh to which the tag is to be applied.

2. In a tool for attaching identifying tags to animals, the combination, with the tag applying means including movable jaws, of a U-shaped member carried by one of the jaws and projecting outwardly in front of the same to determine the thickness of flesh to which the tag is to be applied.

3. In a tool for attaching identifying tags to animals, the combination of a pair of movable jaws, centering means carried by the jaws, said jaws having recesses in their faces adjacent said centering means to receive the end plates of the tag, and means for crimping one part of the tag onto another part to secure it to the animal.

4. In a tool for attaching identifying tags to animals, the combination of a pair of movable jaws, tag centering means carried by the jaws, said jaws having recesses in their faces surrounding said centering means in which the end plates of the tag are seated, releasable flat spring fingers having portions disposed adjacent said recesses, and means for crimping the end of the shank portion of the tag onto one of the end plates while it is being applied to the animal.

In testimony whereof, I affix my signature, in presence of two witnesses.

SAMUEL R. NICHOLS.

Witnesses:
 FRANK R. VAN KEUREN,
 F. L. SMITH.